United States Patent
Urban et al.

(10) Patent No.: US 9,500,535 B1
(45) Date of Patent: Nov. 22, 2016

(54) DETERMINING TEMPERATURE USING MULTIPLE SENSORS

(71) Applicant: Amazon Technologies, Inc., Reno, NV (US)

(72) Inventors: Bradley David Urban, Cupertino, CA (US); Vaughn Todd Arnold, Scotts Valley, CA (US); David Boyd Townsley, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 641 days.

(21) Appl. No.: 13/929,464

(22) Filed: Jun. 27, 2013

(51) Int. Cl.
*G01K 7/16* (2006.01)

(52) U.S. Cl.
CPC ...................... *G01K 7/16* (2013.01)

(58) Field of Classification Search
CPC .............................. G01K 7/425; G06F 1/206
See application file for complete search history.

(56) References Cited

U.S. PATENT DOCUMENTS

| | | | | |
|---|---|---|---|---|
| 6,698,921 B2 * | 3/2004 | Siefert | ..................... | G01K 7/42 374/107 |
| 8,306,772 B2 * | 11/2012 | Cox | ......................... | G01K 7/42 702/132 |

* cited by examiner

*Primary Examiner* — Elias Desta
(74) *Attorney, Agent, or Firm* — Polsinelli LLP

(57) ABSTRACT

Each of one or more temperature sensors of a computing system can measure and provide a temperature value (e.g., provide temperature data) to the system. In some embodiments, the system can apply an offset value, a time-based filter, and a weighting factor to each temperature value received from the one or more temperature sensors of the system. Based, at least in part, on the offsetting, filtering, and/or weighting, the computing system can determine (e.g., calculate, estimate, predict, etc.,) a temperature value representative of an enclosure temperature of the system. In some embodiments, based on the determined temperature value that is representative of the enclosure temperature, the computing system can perform appropriate subsequent processing in accordance with thermal management of the system.

20 Claims, 8 Drawing Sheets

DETERMINING TEMPERATURE USING MULTIPLE SENSORS

BACKGROUND

Computing devices are becoming more commonplace, are being used for a wider variety of purposes, and have an increasing amount of functionality. Computing devices are increasingly being used for computationally intense and/or power consuming tasks, such as running games with complicated graphics, providing real-time geolocation information, playing high definition videos, or other routines. In some cases, computationally intense tasks, power consuming tasks, and/or other tasks undergone by a computing device can cause a temperature of the computing device to change. For example, running a high graphics gaming application can cause an enclosure temperature of the computing device to increase. In another example, charging the battery of the computing device on a hot day can further increase an enclosure temperature of the device. Conventional approaches typically do not utilize an exterior thermistor to measure the enclosure temperature of the computing device, due to cost, inconvenience, and/or other factors. However, if the enclosure temperature of the computing device becomes too hot, it might cause discomfort or other concerns for a user of the computing device, thereby reducing the overall user experience associated with using the device. Moreover, when a temperature of the computing device becomes too hot, one or more performance aspects of the computing device can be negatively affected as well.

BRIEF DESCRIPTION OF THE DRAWINGS

Various embodiments in accordance with the present disclosure will be described with reference to the drawings, in which.

DETAILED DESCRIPTION

Figure 1:
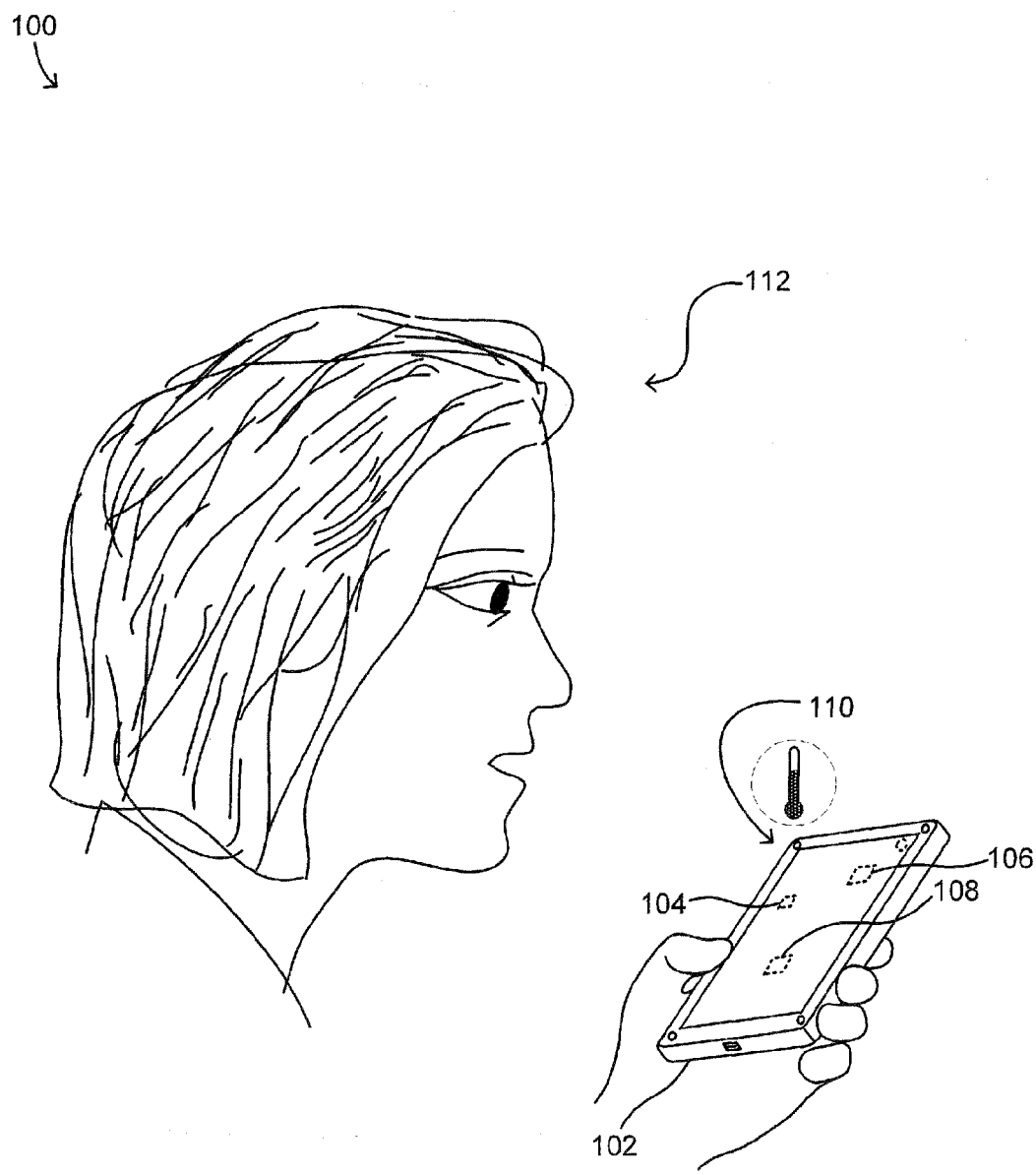
FIG. 1 illustrates an example environment in which aspects of the various embodiments can be utilized.

Systems and methods in accordance with various embodiments of the present disclosure overcome one or more of the above-referenced and other deficiencies in conventional approaches to device thermal management. In particular, various embodiments of the present disclosure enable a representative enclosure temperature to be determined based, at least in part, on modifying temperature values provided by internal temperature sensors.

In some embodiments, the disclosed technology can enable each of one or more temperature sensors of a computing system to measure and provide a temperature value. In some embodiments, the temperature sensors can be internal temperature sensors of the computing system, such as board-level thermistors or thermostats. The temperature value provided by each of the one or more temperature sensors can be received or otherwise accessed at the system. The system can implement a temperature determination scheme to determine (e.g., calculate, estimate, predict, etc.) a temperature value that is representative of an enclosure temperature of the system.

In some embodiments, the disclosed technology can apply an offset value, a time-based filter, and a weighting factor to each temperature value received from the temperature sensors of the system. In some cases, the offset value can indicate a linear correlation or relation between a temperature value and the enclosure temperature of the system. In some embodiments, a previous state of each temperature value from the temperature sensors can be stored. The time-based filter can, for example, correspond to an exponential weighted moving average (EWMA). The exponential weighted moving average can utilize a current state of a particular temperature value and the previous state of the particular temperature value to provide a meaningful average temperature value for a particular temperature sensor. Furthermore, in some instances, a weighting factor can be applied to each temperature value to take into account a level of significance or influence the temperature value has with respect to the enclosure temperature of the system. Based, at least in part, on the offsetting, filtering, and/or weighting, the system can determine (e.g., calculate, estimate, predict, etc.,) a temperature value representative of the system enclosure temperature.

In some embodiments, based on the determined temperature value that is representative of the enclosure temperature, the computing system can implement a thermal (or power) management scheme. The thermal (or power) management scheme can adjust or modify various performance aspects and/or components of the computing system based on the determined temperature value representative of the enclosure temperature. For example, if the representative temperature value meets or exceeds a specified thermal threshold, then the thermal (or power) management scheme can decrease processor performance, reduce a battery charge rate, increase cooling, and/or implement other procedures in attempt to regulate a thermal state (e.g., the enclosure temperature, internal temperate, etc.) of the system. In another example, if the representative temperature value is below the specified thermal threshold, then the thermal (or power) management scheme can increase processor performance, increase a battery charge rate, reduce cooling, and/or implement other appropriate procedures. Other example actions of the thermal (or power) management scheme can include (but are not limited to) adjusting a central processing unit (CPU) of the computing system, adjusting a graphics processing unit (GPU) of the computing system, modifying a memory of the computing system, modifying a bandwidth associated with the computing system, and/or modifying a modem power associated with the computing system.

Various other functions and advantages are described and suggested below as may be provided in accordance with the various embodiments.

FIG. 1 illustrates an example environment 100 in which aspects of the various embodiments can be implemented. The example environment 100 can include a computing device 102. The computing device 102 can include one or more temperature sensors (e.g., thermistors, thermostats, or other sensors capable of measuring or providing a temperature value). In the example of FIG. 1, the computing device 102 can include temperature sensors 104, 106, and 108. In some embodiments, the one or more temperature sensors (e.g., 104, 106, 108) can comprise board level thermistors included on a circuit board of the computing device 102, such as a central processing unit (CPU) thermostat, a distributed temperature sensing (DTS) device, etc.

As shown in FIG. 1, a user 112 of the computing device 102 can be interacting with or otherwise utilizing the device 102. In some cases, the user 112 can use the device 102 to operate an application (i.e. app), such as a game app, a social network app, or an Internet browser app. In some cases, the user 112 can utilize the device 102 to play media, such as videos, music, or images. In some cases, the user 112 can charge the computing device 102 in order to restore energy to the device 102 (e.g., recharging a battery of the device 102). Moreover, in some cases, the device 102 can multitask, such as simultaneously running an application, downloading a software update, playing music, and charging its energy storage (e.g., battery).

In some instances, one or more operations of the device 102 can cause a change in a temperature measured with respect to the device 102. In one example, the user 112 can engage in a computationally intensive operation using the device 102, thereby causing an enclosure temperature (i.e., skin temperature, exterior temperature, external temperature, etc.) 110 to increase. In the example, as the user 112 is using the device 102, the front exterior (e.g., display screen, touch sensor, touch display, etc.), the back exterior, and/or the side exterior(s) of the device 102 can become hot. In some cases, the increase in temperature of the device 102 can cause discomfort and/or other concerns with respect to the user 112. Moreover, in some cases, the increase in temperature can cause one or more aspects of the device 102 to be negatively affected (e.g., reduced performance, damaged components, etc.).

Often times, measuring an actual enclosure temperature of the computing device 102 can be impossible or impractical due to cost, aesthetics, and/or other reasons. However, being able to determine (e.g., calculate, estimate, approximate, predict, etc.) an enclosure temperature of the device 102 can be useful in improving the performance of the device 102. In some embodiments, calculating a temperature value representing or approximating an actual enclosure temperature, temperature can be advantageous. In some instances, having calculated the representative temperature value (i.e., proxy temperature value) of the device's exterior, enclosure, skin, etc., can allow the device 102 to implement a thermal (or power) management scheme. The thermal (or power) management scheme can adjust or modify various performance aspects and/or components of the computing system based on the calculated representative temperature value. In one example, when the device 102 determines that the representative temperature value at least meets a specified temperature threshold, then the device 102 can decrease CPU performance, reduce an energy charging rate, and/or increase a cooling mechanism, etc. In another example, if the representative temperature value is below the specified temperature threshold, then the device 102 can increase CPU performance, increase an energy charging rate, reduce a cooling mechanism, etc. Various embodiments of the present disclosure enable the computing device 102 to determine a temperature value representative of an enclosure temperature of the device 102 using one or more temperature sensors within the computing device 102.

Figure 2:
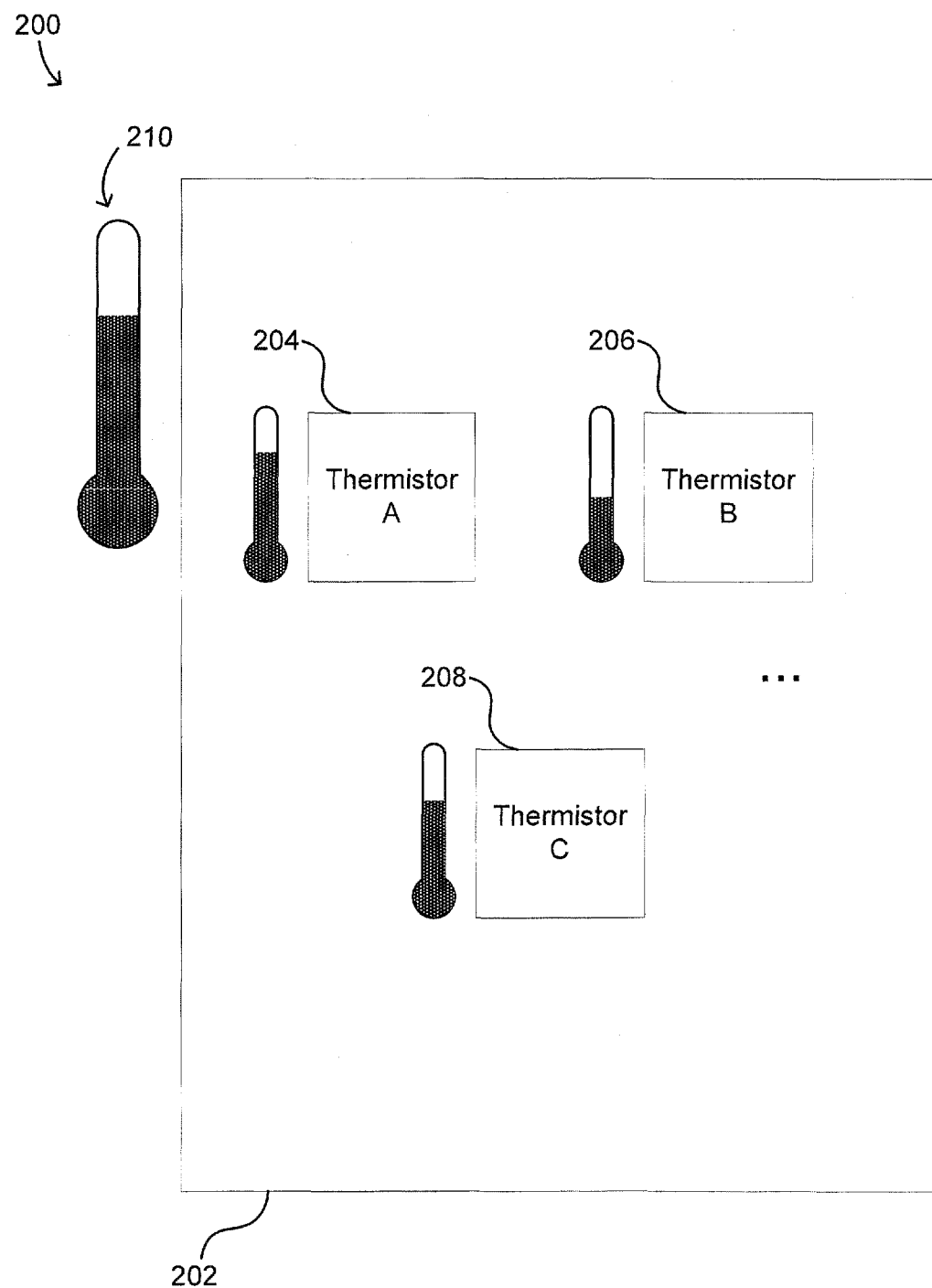
FIG. 2 illustrates an example system embodiment for determining temperature using multiple sensors.

With reference now to FIG. 2, an example system embodiment 200 for determining temperature using multiple sensors is illustrated. In the example system embodiment 200, there can be a computing device 202. The computing device 202 can include one or more temperature sensors, such as Thermistor A 204, Thermistor B 206, and Thermistor C 208. The temperature sensors can be located at various locations with respect to the computing device 202. In some embodiments, the temperature sensors can be located in the interior of the device 202 (i.e., within the exterior, enclosure, skin, casing, and/or shell, etc., of the device 202). In one example, the temperature sensors 204, 206, and 208 can be located at or embedded with one or more circuit boards of the computing device 202.

As shown in FIG. 2, each of the temperature sensors 204, 206, and 208 can measure a temperature value and provide a temperature reading. In some embodiments, there can be a correlation or relation between the one or more temperature sensors and an enclosure temperature (e.g., 210) of the computing device 202. In one example, if the temperature value(s) of the one or more temperature sensors increases, then the enclosure temperature 210 of the computing device 202 can increase as well. In another example, if the temperature value(s) of the one or more temperature sensors decreases, then the enclosure temperature 210 of the device 202 can also decrease. Accordingly, in at least some embodiments, the disclosed technology can utilize the correlation(s) or relation(s) between the one or more temperature sensors and an enclosure temperature (e.g., 210) of the device 202 to determine (e.g., approximate, predict, etc.) a value for the enclosure temperature.

Further, it is contemplated that although the one or more temperature sensors are shown as being three thermistors (204, 206, 208) in FIG. 2, a person having ordinary skill in the art would recognize that there can be more or less temperature sensors in quantity, as well as different types of components capable of sensing temperature.

Figure 3:
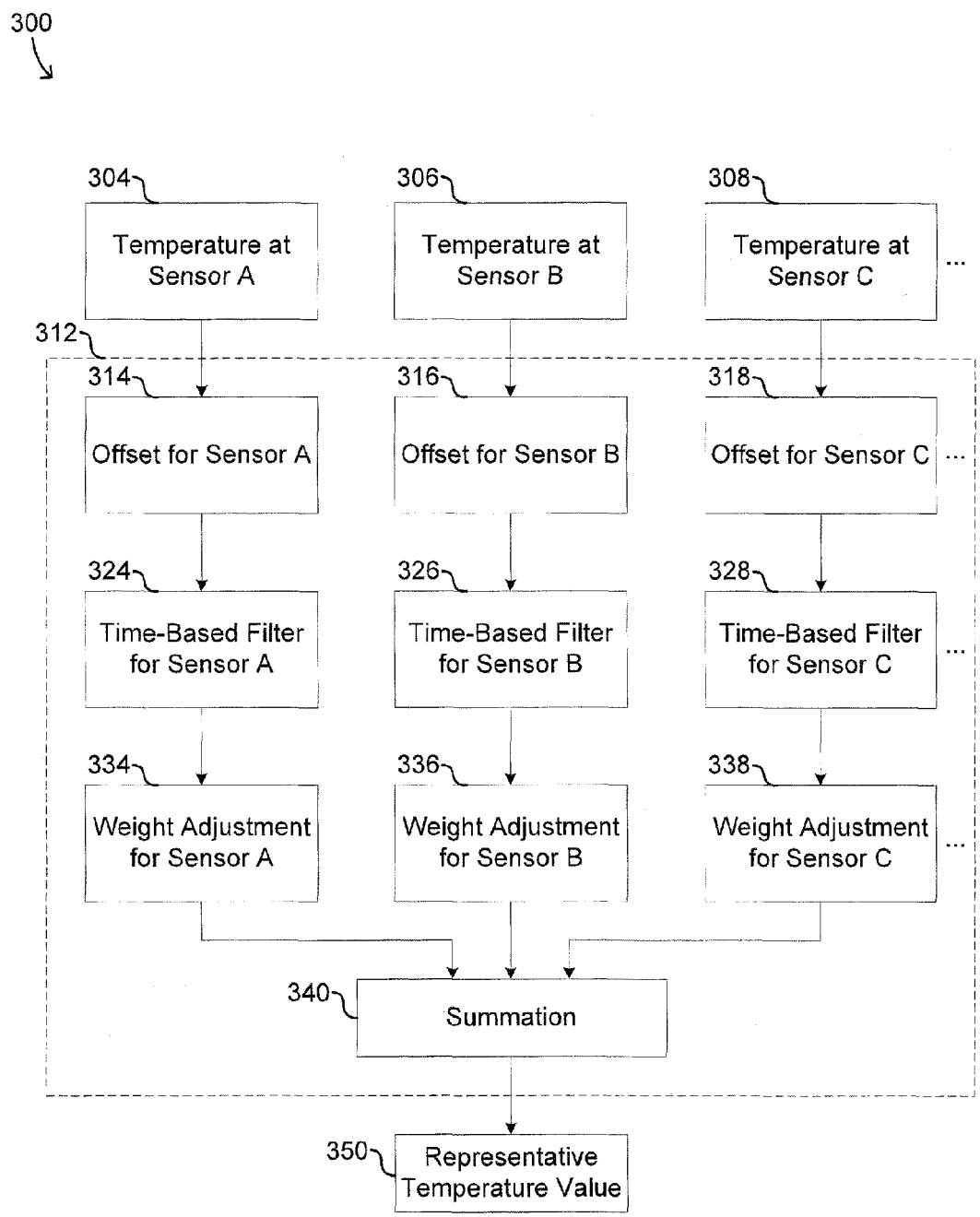
FIG. 3 illustrates an example flowchart for determining temperature using multiple sensors.

With reference now to FIG. 3, FIG. 3 illustrates an example flowchart 300 for determining temperature using multiple sensors. The various steps, procedures, etc., of the example flowchart 300 can be performed by a computing device, for example. The computing device can include one or more temperature sensors, such as Sensor A, Sensor B, and Sensor C. Each of the temperature sensors can measure and/or provide a temperature value. For example, Sensor A can measure the temperature 304 at or near Sensor A and transmit information about the temperature 304 to the computing device. Similarly, Sensor B can measure the temperature 306 at or near Sensor B and provide information about the temperature 306 to the computing device. Likewise, Sensor C can measure and provide temperature 308 to the device. Accordingly, the computing device can receive (information about) temperature values 304, 306, and 308 from Sensors A, B, and C, respectively.

Various embodiments of the present disclosure can enable the computing device to process the received temperature values 304, 306, and 308 (or information about the received temperature values) in accordance with a temperature determination scheme (e.g., process, algorithm, system, etc.) 312. It is contemplated that the temperature determination scheme 312 can be implemented in hardware, software, or any combination thereof. In some embodiments, the temperature determination scheme 312 can apply an offset value (i.e., offset) to each received temperature value. In some cases, there can one or more offsets for the one or more temperature sensors (e.g., A, B, and C). In other words, in some cases, one offset value can correspond to one temperature sensor. As shown in FIG. 3, for example, offset 314 can be applied to the temperature value 304 received from Sensor A, offset 316 can be applied to the temperature value 306 received from Sensor B, and offset 318 can be applied to the temperature value 308 received from Sensor C.

In some embodiments, each offset can be specifically configured for a particular temperature sensor. In one example, based on testing, experimentation, and/or other data gathering or configuration processes, it can be observed that when the enclosure temperature of the computing device is X degrees (e.g., Celsius, Fahrenheit, etc.), then the temperature 304 measured at Sensor A is X+4 degrees. Continuing with this example, it can also be observed that when the enclosure temperature of the device is X degrees, the temperature 306 measured at Sensor B is X+10 degrees, while the temperature 308 measured at Sensor C is X−2 degrees. Accordingly, in this example, the offset 314 for Sensor A can be 4, the offset 316 for Sensor B can be 10, and the offset 318 for Sensor C can be −2. As such, whatever temperature values (304, 306, 308) are measured at the temperature sensors (A, B, and C, respectively) can be offset by the corresponding offset values (314, 316, and 318, respectively). In this example, temperature 304 can be modified by a subtraction of 4, temperature 306 can be modified by a subtraction of 10, and temperature 308 can be modified by a subtraction of −2 (i.e., an addition of 2).

Continuing with FIG. 3, the temperature values (304, 306, 308), having been modified by their respective offset values (314, 316, 318), can also be filtered. In some embodiments, one or more time-based filters (e.g., 324, 326, 328) can be applied to the offset temperature values. In some embodiments, time-based filtering can utilize an infinite impulse response function. The infinite impulse response function can apply weighting factors that decease exponentially over time. The infinite impulse response function can have an impulse response function that is non-zero over an infinite length of time. In the infinite impulse response function, the weighting for each older datum point can decrease exponentially, never reaching zero. As such, for example, previous temperature values measured by the temperature sensors can be taken into consideration (and each given its appropriate weight and/or significance) when calculating current temperature values.

In some embodiments, the infinite impulse response function can correspond to an exponentially weight moving average (EWMA). For example, the EWMA can be a type of infinite impulse response function. Exponentially weight moving averages can be used to analyze a set of data points by creating a series of averages of different subsets of the full data set. In one example, the computing device can be provided with current temperature values from Sensors A, B, and C in addition to previous (e.g., 1 minute ago, 10 seconds ago, last known state, etc.) temperature values from Sensors A, B, and C. Exponentially weight moving averages can be calculated using the current and previous temperature values from Sensors A, B, and C. In this example, exponentially weight moving averages can be calculated in accordance with the following formula:

$$S(i) = \{\alpha^*[T(i) - T_{offset}]\} + [(1-\alpha)^*S(i-1)].$$

In some cases, the above formula can be referred to as an infinite impulse response function. In the above formula, $S(i)$ can correspond to an exponentially weighted moving average for the current temperature value (i.e., a current exponentially weighted moving average, an exponentially weighted moving average for the temperature value at the current time), while the remaining portions of the formula can be an equation for calculating the exponentially weighted moving average for the current temperature value (e.g., $S(i)$). In some cases, $S(i)$ can be referred to as a filtered temperature value, which can be calculated by applying an infinite impulse response function (e.g., $\{\alpha^*[T(i) - T_{offset}]\} + [(1-\alpha)^*S(i-1)]$). In the formula, i can correspond to the current time (or another time of interest). Moreover, coefficient $\alpha$ can represent a degree of weighting decrease, which can be a constant smoothing factor between 0 and 1. In some cases, a higher $\alpha$ can indicate that older data discounts faster (i.e., will become less significant at a quicker rate), whereas a lower $\alpha$ can indicate that older data discounts slower (i.e., will become less significant at a slower rate). Also, there can be various $\alpha$ coefficients utilized with the exponentially weighted moving average, such that each $\alpha$ coefficient is associated with (e.g., specifically configured for) a particular temperature sensor. For example, each of the time-based filters 324, 326, and 328 can be configured for a particular temperature sensor (A, B, and C, respectively). A respective coefficient $\alpha$ can be configured for each temperature sensor based on testing, experimentation, observation, configuration, manufacturing, etc. As a result, for example, the $\alpha$ coefficient for Sensor A can be different from those of Sensors B and C, and the $\alpha$ coefficient for Sensor B can be different from that of Sensor C, and so forth. In some embodiments, a can be calculated such that the time scales of each temperature sensor are representative of the time scales of the temperature of interest (e.g., enclosure temperature). In one example, a can be calculated using a least squares method that is fit to the appropriate data.

Furthermore, in the previous formula, $T(i)$ can correspond to the temperature value provided by a particular temperature sensor at the current time, and $T_{offset}$ can correspond to the temperature offset value for that particular temperature sensor. Further, $S(i-1)$ can correspond to a previous state associated with the current exponentially weighted moving average. In other words, $S(i-1)$ can correspond to the exponentially weighted moving average calculated for a previous time $(i-1)$, which can depend on the temperature value at the previous time and the exponentially weighted moving average calculated at a time prior to the previous time $(i-2)$. As such, the current exponentially weighted moving average can vary depending on the current temperature value, and recursively on the previous temperature value and the previous exponentially weighted moving average.

Although not illustrated in FIG. 3, in some embodiments, the filtered value for the (already offset) temperature value from Sensor A can be represented by: $S_A(i) = \{\alpha_A^*[T_A(i) - T_{A,offset}]\} + [(1-\alpha_A)^*S_A(i-1)]$. $S_A(i)$ can represent the value of the exponentially weighted moving average for the temperature at (or near) Sensor A at time i. Coefficient $\alpha_A$ can be the coefficient for Sensor A, which can determine how quickly or slowly previous Sensor A temperature values are discounted. $T_A(i)$ can be the temperature measured/provided by Sensor A at time i. $T_{A,offset}$ can correspond to the offset value for Sensor A. $S_A(i-1)$ can correspond to the value of the exponentially weighted moving average for the temperature at (or near) Sensor A at a time just prior to time i.

Similarly, the EWMA filtered value for the (already offset) temperature value from Sensor B can be represented by: $S_B(i) = \{\alpha_B^*[T_B(i) - T_{B,offset}]\} + [(1-\alpha_n)^*S_B(i-1)]$. Likewise, the EWMA filtered value for the (already offset) temperature value from Sensor C can be represented by: $S_C(i) = \{\alpha_C^*[T_C(i) - T_{C,offset}]\} + [(1-\alpha_C)^*S_C(i-1)]$.

In some embodiments, the already offset and filtered temperature values from Sensors A, B, and C can be weighted, as shown in FIG. 3. The weighting can be useful for adjusting the relative importance of the temperature sensors, whereas the EWMA can be useful for adjusting time scales. In some cases, a particular temperature can have more weight (e.g., influence, significant, etc.) than another temperature with regard to predicting or determining a device enclosure temperature. In one example, if temperature Sensor A is closer to the exterior of the device than compared to temperature Sensor B, then Sensor A can be assigned a higher weighting factor than Sensor B, because the temperature reading from Sensor A can be more deterministic of the actual device enclosure temperature than that from Sensor B. In another example, if it has been observed that the temperature values provided by Sensor C over time are low and mostly constant, whereas those provided by Sensor B are higher and have a greater range of fluctuation, then Sensor C can be assigned a lesser weight than Sensor B. As such, the weighting of the temperature values can emphasis certain temperature values that are more likely to influence the enclosure temperature, while deemphasizing other temperature values that are less likely to influence or likely to have less influence on the enclosure temperature.

It follows that weighting factors (or weight adjustments) can be configured for each temperature sensor. In some embodiments, the weighting factors can be calculated by fitting the data for multiple power dissipation scenarios and/or thermal environments, such that the combination of weighted temperature values sufficiently and/or optimally represents the temperature of interest (e.g., enclosure temperature). In one example, this can be achieved by utilizing a least squares method. Continuing with the example of FIG. 3, weight adjustment (or factor) 334 can be applied to the offset and filtered temperature at Sensor A, weight adjustment 336 can be applied to the offset and filtered temperature at Sensor B, and weight adjustment 338 can be applied to the offset and filtered temperature at Sensor C. Moreover, in some embodiments, each of the weight adjustments can be a value between 0 and 1, and the sum of all of the weight adjustments (for all temperature sensors) can be equivalent to 1. For example, assuming that the computing device only has three sensors (A, B, C), if Sensor A is assigned a weight of 0.6 and if Sensor B is assigned a weight of 0.3, then Sensor C should be assigned a weight of 0.1.

Upon offsetting, filtering, and weighting the temperature values from the temperature sensors of the computing device, the offset, filtered, and weighted temperature values can be summed together 340. The summation 340 of the offset, filtered, and weighted temperature values can result in a temperature value 350 representative of the device enclosure temperature.

The temperature value 350 (also known as a proxy temperature, derived temperature, representative temperature, determined temperature, etc.) can serve as an indicator, measurement, or approximation of the actual enclosure temperature of the computing device.

In some embodiments, the weighting (e.g., 334, 336, 338) and the summation 340 can be similar to obtaining an average of the temperature values. In one example, the weighting factors for the three sensors A, B, and C can be equal (⅓ or 0.33). Thus, when the weighted temperature values for sensors A, B, and C are summed together, the summing of the weighted values would be equivalent to calculating the average (i.e., arithmetic mean) of the three temperature values. However, when different weight values (i.e., adjustments, factors) are applied to the temperature values, then the summation 340 can take into account the emphases and/or de-emphases embodied in the weight values, and result in a more accurate proxy temperature 350 for the device enclosure temperature.

Figure 4:
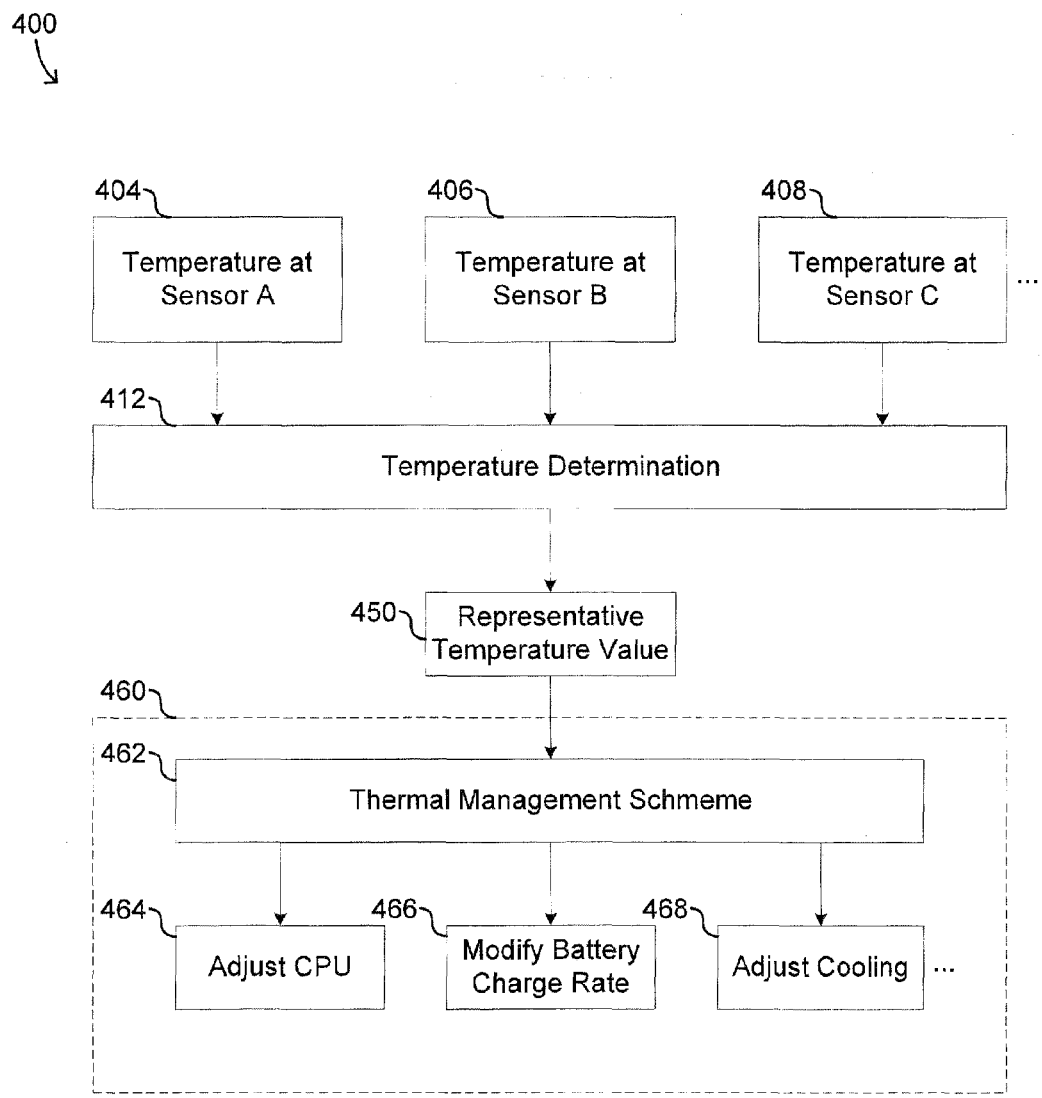
FIG. 4 illustrates an example flowchart for determining temperature using multiple sensors.

FIG. 4 illustrates an example flowchart 400 for determining temperature using multiple sensors. As shown in FIG. 4, the example flowchart 400 can illustrate one or more operations of an example computing device (or computing system). The example computing device can include temperature sensors A, B, and C. Sensor A can measure and provide a temperature 404 at (or near) Sensor A. The temperature 406 at Sensor B can be measured by Sensor B. Likewise, Sensor C can also provide a temperature value 408.

Continuing with the example of FIG. 4, the computing device can have an enclosure temperature. In this example, the device can receive or otherwise access the temperature values 404, 406, and 408 from sensors A, B, and C, respectively. The device can operate a temperature determination scheme 412 using the received temperature values 404, 406, and 408. Similar to previous discussions, the temperature values 404, 406, and 408 can be offset, filtered, weighted, and/or otherwise modified by the temperature determination scheme 412. Based on the offset, filtered, weighted, and/or otherwise modified temperature values, the temperature determination scheme 412 can generate a proxy temperature 450 (also known as a representative temperature, derived temperature, determined temperature, etc.) which can be representative of or an approximation of the actual device enclosure temperature.

In some embodiments, the example flowchart 400 can include performing subsequent processing 460 upon deriving/determining the proxy temperature value 450 from the temperature values 404, 406, and 408 provided by sensors A, B, and C. In some cases, the subsequent processing 460 can include a thermal (or power) management scheme 462. The thermal management scheme 462 can receive or access the representative temperature value 450. In some embodiments, if the representative temperature value 450 meets or exceeds a specified temperature/thermal threshold (e.g., overheats), then the thermal management scheme 462 can attempt to lower the enclosure temperature of the device. In one example, the thermal management scheme 462 can adjust one or more performance aspects of the central processing unit (CPU) or processor 464 of the computing device. In another example, the thermal (or power) management scheme 462 can modify an energy charging rate 466 (e.g., battery charging rate) associated with the device. In a further example, the thermal management scheme 462 can adjust one or more cooling mechanisms 468 (e.g., turn on/off a fan or increase/decrease a fan speed) implemented by the device. The thermal (or power) management scheme 462 can initiate these and other measurements, separately or in combination, in attempt to reduce the enclosure temperature of the device.

Figure 5:
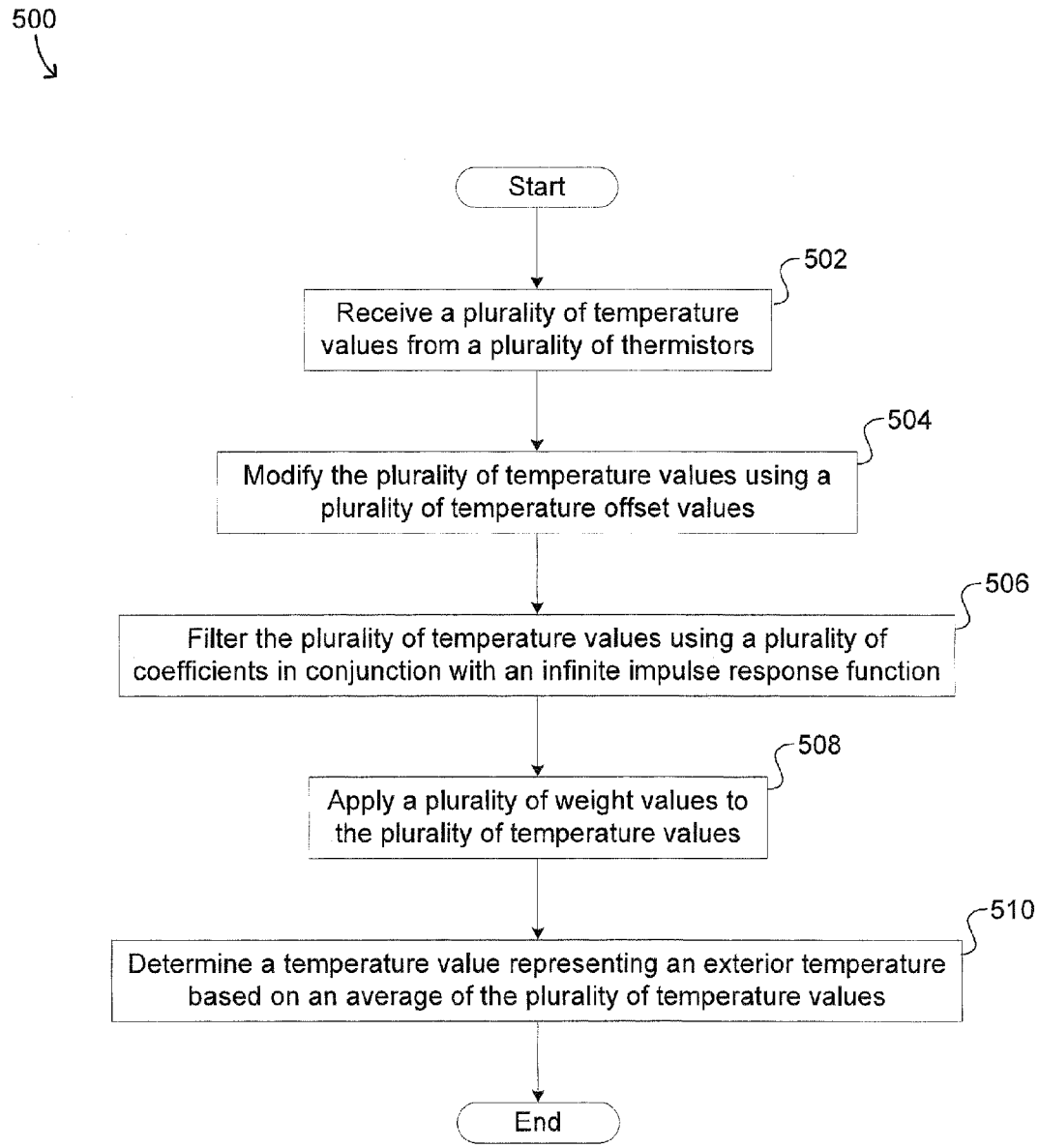
FIG. 5 illustrates an example method embodiment for determining temperature using multiple sensors.

FIG. 5 illustrates an example method embodiment 500 for determining temperature using multiple sensors. It should be understood that there can be additional, fewer, or alternative steps performed in similar or alternative orders, or in parallel, within the scope of the various embodiments unless otherwise stated. At step 502, the example method embodiment 500 can receive a plurality of temperature values from a plurality of temperature sensors of the computing system. Each temperature value can be measured and provided by a respective temperature sensor of the plurality of temperature sensors. The example method 500 can modify the plurality of temperature values using a plurality of temperature offset values, at step 504. Each temperature value can be modified using a respective temperature offset value of the plurality of temperature offset values. In some cases, each temperature offset value can be configured for a respective temperature sensor of the plurality of temperature sensors.

Step 506 can include filtering the plurality of temperature values using a plurality of coefficients in conjunction with an infinite impulse response function. A respective coefficient used in conjunction with the infinite impulse response function can perform the filtering with respect to each temperature value. In some embodiments, each coefficient can be configured for a respective temperature sensor. Then at step 508, the method 500 can apply a plurality of weight values to the plurality of temperature values. Each temperature value can be applied a respective weight value of the plurality of weight values. In some instances, each weight value can be configured for a respective temperature sensor. Then step 510 can include determining a temperature value representing an enclosure temperature of the computing system based, at least in part, on an average of the plurality of temperature values.

Figure 6:
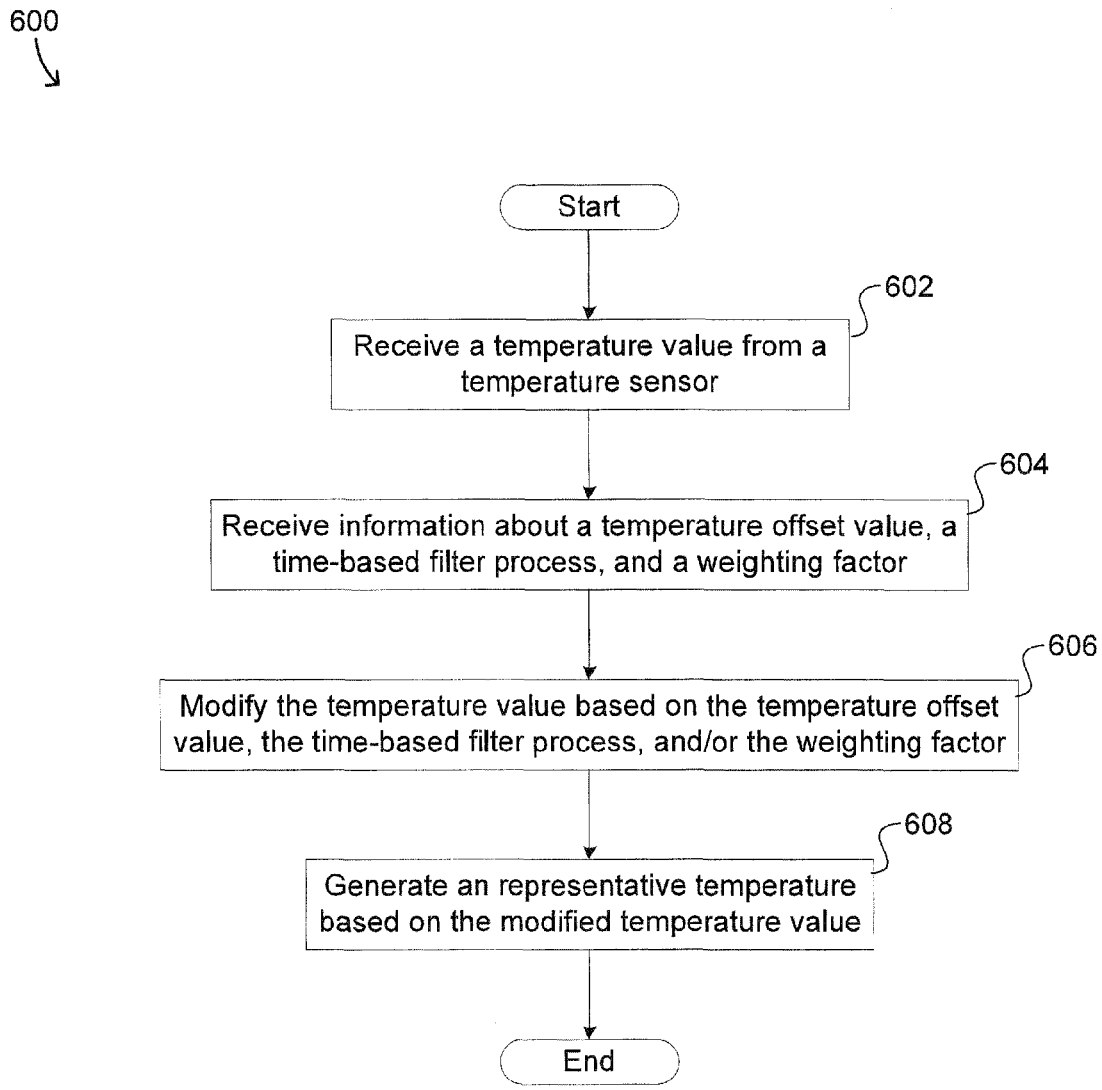
FIG. 6 illustrates an example method embodiment for determining temperature using multiple sensors.

FIG. 6 illustrates an example method embodiment 600 for determining temperature using multiple sensors. Again, it should be understood that there can be additional, fewer, or alternative steps performed in similar or alternative orders, or in parallel, within the scope of the various embodiments unless otherwise stated. The example method embodiment 600 can start with receiving a temperature value from a temperature sensor, at step 602. Then at step 604, the example method 600 can receive information about a temperature offset value for the temperature sensor, a time-based filter process for the temperature sensor, and a weighting factor for the temperature sensor.

Step 606 can include modifying the temperature value based, at least in part, on the temperature offset value, the time-based filter process, and/or the weighting factor. Then the method 600 can generate a representative temperature based, at least in part, on the modified temperature value, at step 608.

Various embodiments of the present disclosure can also implement different orders for the offsetting, the filtering, and the weighting. For example, the filtered value for a temperature at/near a temperature sensor can be calculated prior to the offsetting and weighting. In this example, the filtered value associated with an exponentially weighted moving average can be represented by: $S(i)=[\alpha*T(i)]+[(1-\alpha)*S(i-1)]$. In this equation, the filtered value is calculated based on the temperature value at time i without having been modified by an offset value (e.g., $T_{offset}$). Similarly, in another example, the weighting can be applied prior to the offsetting and/or the filtering.

It is also contemplated that a person having ordinary skill in the art would recognize that there can be many variations, different implementations, use cases, and/or other embodiments consistent with the scope of the present disclosure.

Figure 7:
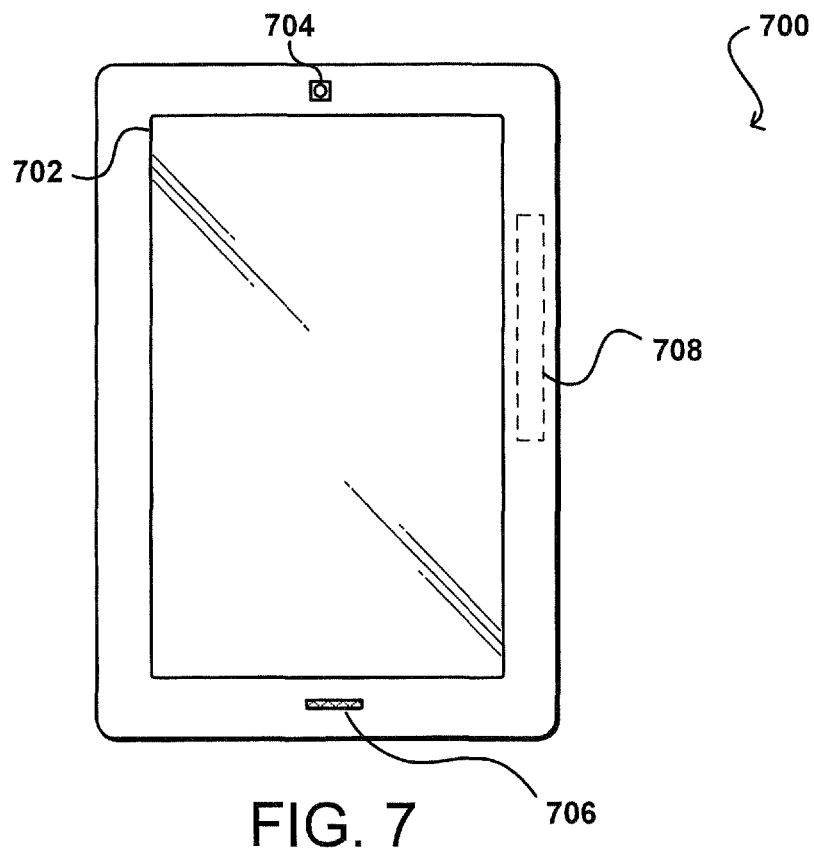
FIG. 7 illustrates an example device that can be used to implement aspects of the various embodiments.

FIG. 7 illustrates an example electronic user device 700 that can be used in accordance with various embodiments. In some embodiments, the example electronic user device 700 can correspond to the client computing device 102 of FIG. 1. Although a portable computing device (e.g., an electronic book reader or tablet computer) is shown in FIG. 7, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
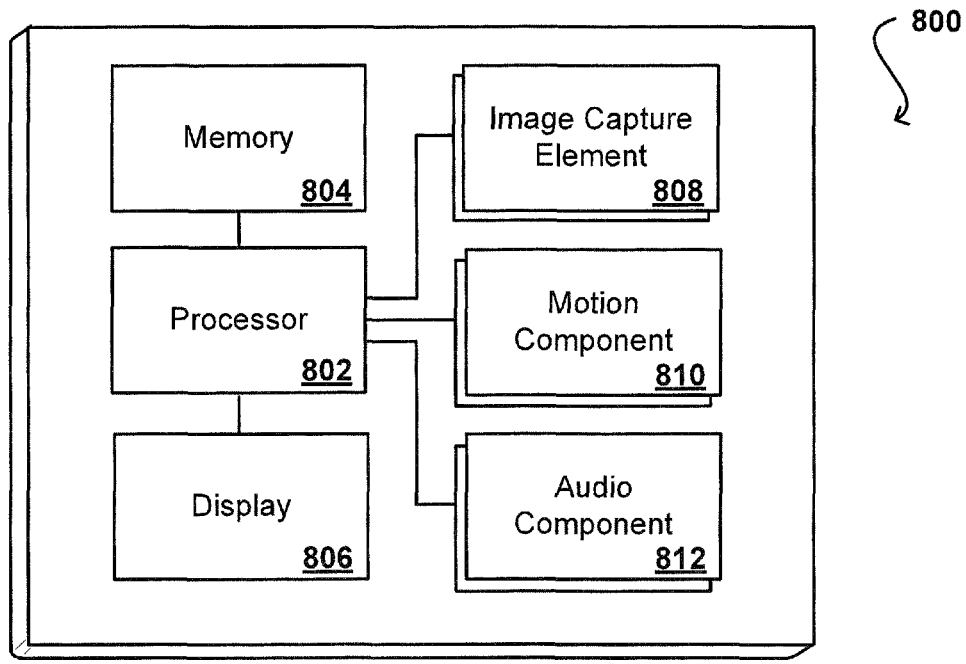
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
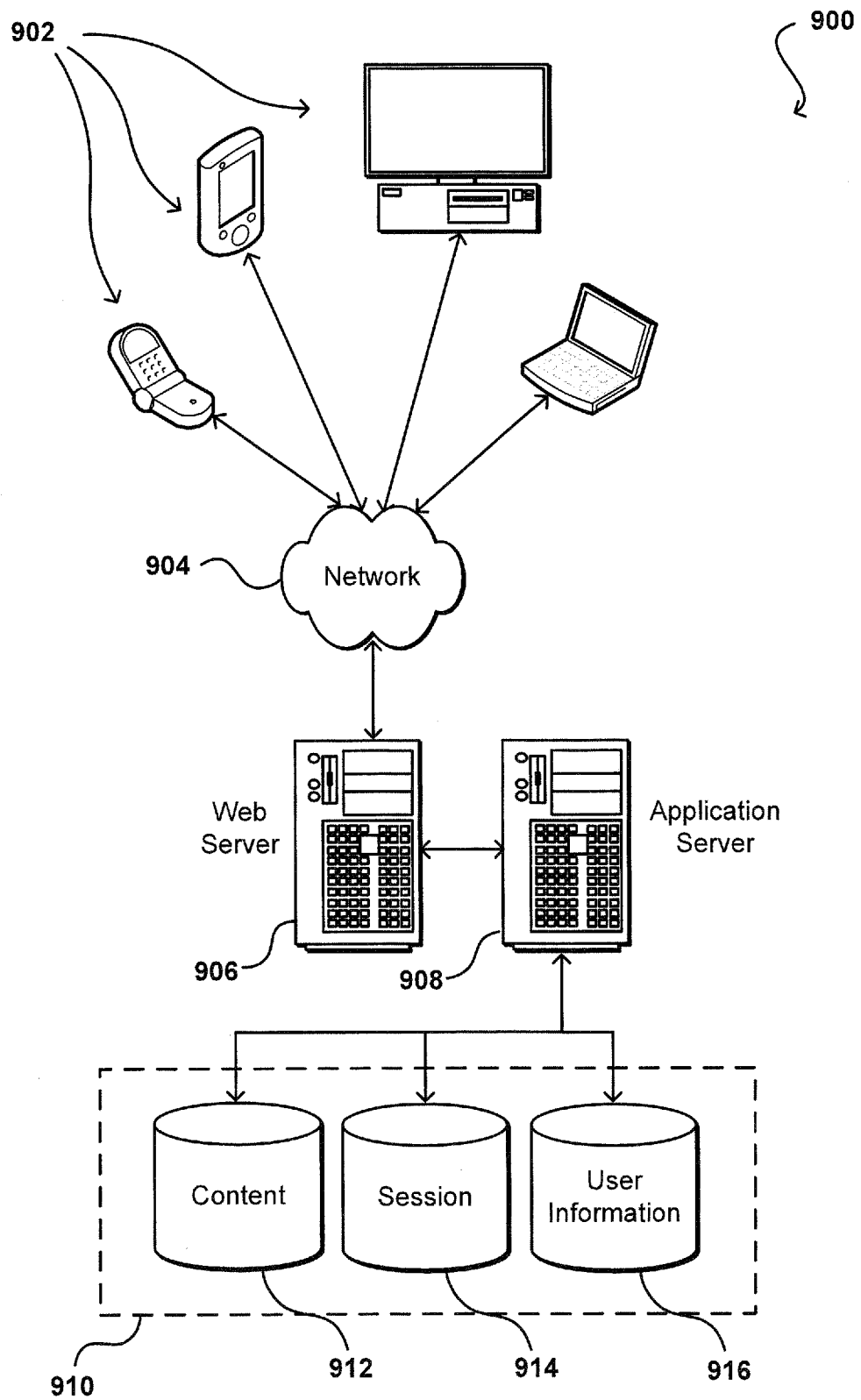
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims

What is claimed is:

1. A computing system comprising:
a plurality of temperature sensors;
at least one processor; and
a memory device including instructions that, when executed by the at least one processor, cause the computing system to:
  receive a plurality of temperature values from the plurality of temperature sensors of the computing system, a temperature value of the plurality of temperature values being provided by a respective temperature sensor of the plurality of temperature sensors;
  create a plurality of adjusted temperature values, the adjusted temperature values being modified by applying a respective temperature offset value for the respective temperature sensor to the temperature value of the plurality of temperature values;
  apply an infinite impulse response function to the plurality of adjusted temperature values to generate a plurality of filtered temperature values, the filtered temperature values being generated by applying the infinite impulse response function to the temperature values, the infinite impulse response function being applied to the adjusted temperature values using a respective coefficient for the respective temperature sensor;
  apply respective weight values to the plurality of filtered temperature values to generate a plurality of weighted temperature values, the respective weight values being configured for the respective temperature sensor; and
  determine a representative temperature value representing a temperature of an enclosure of the computing system based, at least in part, on calculating an average for the plurality of weighted temperature values.

2. The computing system of claim 1, wherein the infinite impulse response function is an exponentially weighted moving average, and wherein the respective coefficient represents a degree of weighting decrease.

3. The computing system of claim 1, wherein the respective weight values are between 0 and 1, wherein a summation of the respective weight values is equal to 1, and wherein calculating the average further comprises:
summing the plurality of weighted temperature values.

4. The computer system of claim 1, wherein the instructions cause the computing system to further:
utilize a thermal management process to regulate a thermal state of the computing system based, at least in part, on the representative temperature.

5. A computer-implemented method comprising:
receiving temperature data from an internal temperature sensor of a computing device;
applying, to the temperature data, at least one of a temperature offset for the internal temperature sensor or a weighting factor for the internal temperature sensor, to generate adjusted temperature data;
applying at least one time-based filter process to the adjusted temperature data to generate filtered temperature data;
calculating, by at least one processor of the computing device, an average temperature value based, at least in part, on the filtered temperature data; and
determining a representative temperature of an enclosure of the computing device based, at least in part, on the average temperature value.

6. The computer-implemented method of claim 5, further comprising:
utilizing a thermal management process to regulate a thermal state of the computing device based, at least in part, on the representative temperature.

7. The computer-implemented method of claim 6, wherein utilizing the thermal management process includes at least one of modifying a performance aspect of a computing processing unit of the computing device, modifying an energy charging rate associated with the computing device, or modifying a cooling process associated with the computing device.

8. The computer-implemented method of claim 5, further comprising:
receiving additional temperature data from a second internal temperature sensor;
applying, to the additional temperature data, at least one of a second temperature offset for the second internal temperature sensor or a second weighting factor for the second internal temperature sensor, to generate adjusted additional temperature data; and
applying at least a second time-based filter process to the adjusted additional temperature data to generate filtered additional temperature data, wherein calculating the average temperature value is further based, at least in part, on the filtered additional temperature data.

9. The computer-implemented method of claim 8, wherein applying the weighting factor to the temperature data further comprises multiplying the temperature data with the weighting factor to generate the adjusted temperature data, wherein applying the second weighting factor to the additional temperature data further comprises multiplying the additional temperature data with the second weighting factor to generate the adjusted additional temperature data, wherein each of the weighting factor and the second weighting factor is between 0 and 1, and wherein calculating the average temperature value further comprises adding, at least in part, the adjusted temperature data and the adjusted additional temperature data.

10. The computer-implemented method of claim 5, wherein filtering the temperature data using the at least one time-based filter process further comprises:
   obtaining a current exponentially weighted moving average for the temperature data based, at least in part, on a previous state associated with the current exponentially weighted moving average for the temperature data.

11. The computer-implemented method of claim 10, wherein obtaining the current exponentially weighted moving average for the temperature data further comprises calculating:

$$S(i)=\{\alpha*[T(i)-T_{offset}]\}+[(1-\alpha)*S(i-1)],$$

wherein $S(i)$ is the current exponentially weighted moving average, wherein i is a current time, wherein $\alpha$ is a coefficient associated with the temperature sensor, wherein $T(i)$ is the temperature data at the current time, wherein $T_{offset}$ is the temperature offset, and wherein $S(i-1)$ is the previous state associated with the current exponentially weighted moving average.

12. The computer-implemented method of claim 11, wherein the previous state associated with the current exponentially weighted moving average is determined based, at least in part, on a previous state associated with the temperature data.

13. The computer-implemented method of claim 12, wherein the coefficient, $\alpha$, represents a degree of weighting decrease, wherein a higher coefficient value corresponds to the previous state associated with the temperature data being discounted at a faster rate, and wherein a lower coefficient value corresponds to the previous state associated with the temperature data being discounted at a slower rate.

14. A non-transitory computer-readable storage medium including instructions, the instructions when executed by at least one processor of a computing device causing the computing device to:
   receive a first temperature value from a first temperature sensor;
   receive a second temperature value from a second temperature sensor;
   determine an adjusted first temperature value based, at least in part, on a first offset value configured for the first temperature sensor, a time-based filtering process that utilizes a first coefficient configured for the first temperature sensor, and a first weighting factor configured for the first temperature sensor;
   determine an adjusted second temperature value based, at least in part, on a second offset value configured for the second temperature sensor, the time-based filtering process that utilizes a second coefficient configured for the second temperature sensor, and a second weighting factor configured for the second temperature sensor; and
   generate a third temperature value based, at least in part, on an average of at least the adjusted first temperature value and the adjusted second temperature value.

15. The non-transitory computer-readable storage medium of claim 14, wherein the first temperature sensor and the second temperature sensor are board-level temperature sensors of the computing device, and wherein the third temperature value is representative of a temperature of an enclosure of the computing device.

16. The non-transitory computer-readable storage medium of claim 14, wherein the instructions cause the computing device to further:
   utilize a thermal management process to regulate a thermal state of the computing device based, at least in part, on the third temperature value.

17. The non-transitory computer-readable storage medium of claim 16, wherein utilizing the thermal management process to regulate the thermal state of the computing device further comprises:
   modifying at least one of a performance aspect of the processor, an energy charging rate associated with the computing device, or a cooling mechanism associated with the computing device.

18. The non-transitory computer-readable storage medium of claim 17, wherein utilizing the thermal management process to regulate the thermal state of the computing device further comprises:
   comparing the third temperature value to a specified temperature threshold; and
   determining an action to be performed to regulate the thermal state of the computing device based, at least in part, on comparing the third temperature value to the specified temperature threshold.

19. The non-transitory computer-readable storage medium of claim 14, wherein the time-based filtering process calculates a first current exponentially weighted moving average for the first temperature value and a second current exponentially weighted moving average for the second temperature value.

20. The non-transitory computer-readable storage medium of claim 19, wherein the first current exponentially weighted moving average for the first temperature value is calculated based on a previous state of the first current exponentially weighted moving average, and wherein the second current exponentially weighted moving average for the second temperature value is calculated based on a previous state of the second current exponentially weighted moving average.

* * * * *